March 25, 1930.　　　　R. T. GRIFFITHS　　　　1,751,733
WINDOW GUIDE
Original Filed July 28, 1926
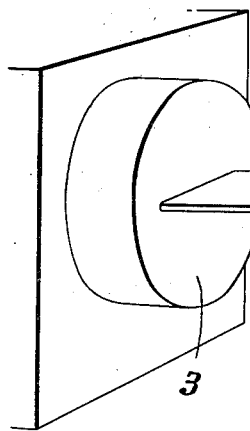
Fig.1.
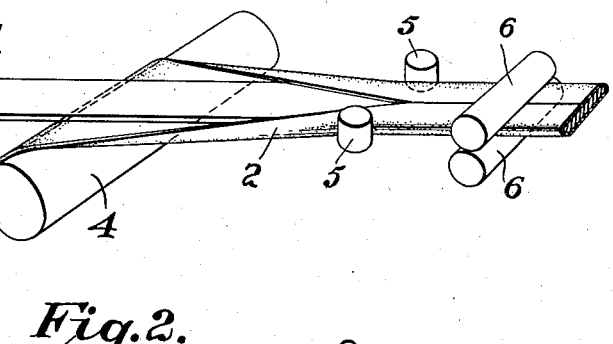
Fig.2.
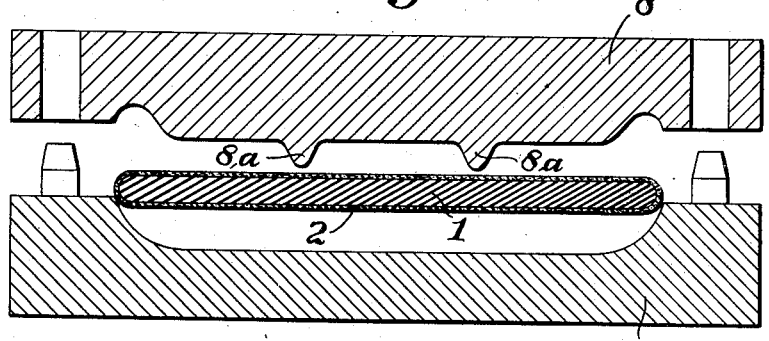
Fig.3.
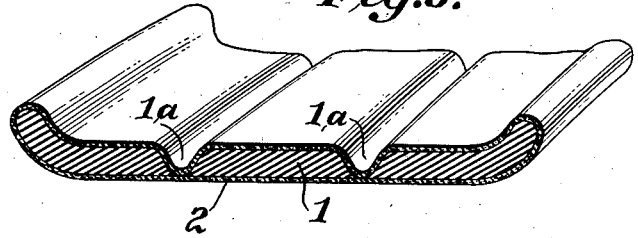
Fig.4.　　　Fig.5.
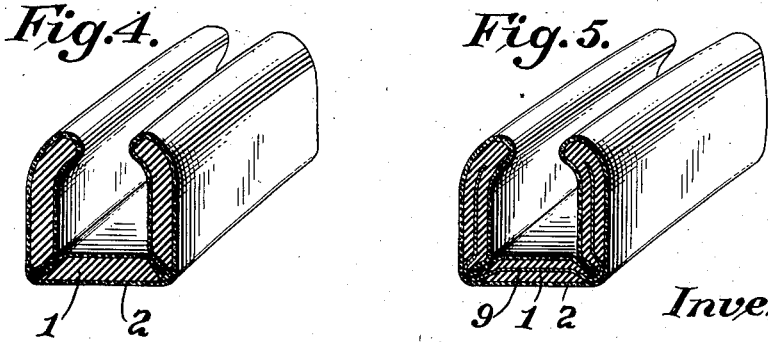
Inventor:
Richard T. Griffiths,
by Spear, Middleton, Donaldson & Hall
Attys.

Patented Mar. 25, 1930

1,751,733

UNITED STATES PATENT OFFICE

RICHARD T. GRIFFITHS, OF AKRON, OHIO, ASSIGNOR TO THE MILLER RUBBER COMPANY, OF AKRON, OHIO, A CORPORATION OF OHIO

WINDOW GUIDE

Original application filed July 28, 1926, Serial No. 124,263. Divided and this application filed February 8, 1927. Serial No. 166,757.

My present invention relates to improvements in flexible window guides for the sliding windows of motor vehicle bodies and the like of the type having a body of rubber and a surfacing of fabric such as felt.

The invention aims to provide a guide, which may be manufactured in flat form, thereby facilitating its manufacture, simplifying its handling and shipment, and enabling its more ready application to the window.

With these and other objects in view the invention includes the novel article hereinafter described, and defined by the appended claims.

In order that the invention may be more readily understood reference is made to the accompanying drawings in which:—

Figure 1 is a perspective view of a diagrammatic nature showing one manner in which the rubber strip may be produced with a fabric covering.

Fig. 2 is a transverse vertical section through a mold for shaping and vulcanizing the article.

Fig. 3 is a perspective view of the completed article, partly broken away.

Fig. 4 is a perspective view of the article, partly broken away, and folded in position for use.

Fig. 5 is a similar view of a modification.

In proceeding according to my method I provide a strip or slab of unvulcanized rubber compound 1 with an envelope or covering 2 of felt or other suitable fabric. This may conveniently, expeditiously, and economically be produced by extruding a strip or slab of rubber from an extruding machine 3, shown conventionally in Fig. 1 having a die opening which will produce a strip or slab of rubber 1 of the desired width and thickness.

A strip or web of fabric 2 of sufficient width to enable it to be wrapped around or encompass the rubber strip, is led from a suitable source, not shown, over a guide roller 4 at which point the rubber strip issuing from the extruding machine is superposed on the fabric centrally of the width thereof. From the guide roller the assembled strips pass to folding means which may be in the shape of rollers 5 journaled to rotate about vertical axes, and rollers 6 journaled to rotate about a horizontal parallel axes. The rollers 5 and 6 fold the margins of the fabric about the rubber strip or body and press it against the strip with sufficient force to cause it to adhere thereto.

The covered strip thus produced may be cut into suitable lengths and is then ready for shaping and vulcanizing. This is accomplished by providing a mold comprising lower and upper sections 7 and 8 having the customary dowel pins and openings. The lower mold section has the main portion of its bottom formed as a plane surface, being curved upward at the sides for a purpose hereinafter set forth. The upper section has its molding face provided with a pair of parallel approximately wedge shaped ribs 8' which, when the mold is closed, press or force the upper fabric surface down to form two parallel channels 1ª in the covered strip, the rubber being forced laterally or displaced by the pressure of the ribs 8ª, whereby lines of fold are formed in the strip. Preferably the ribs 8ª are made of such height that practically all the rubber is displaced at the fold lines and the upper and lower layers of the fabric are pressed together at the bottom of the channels and united by the adherent rubber, so that flexible fabric hinges are provided. The side margins of the male and female portions of the mold sections are so curved that after the mold has been closed and subjected to vulcanizing heat the article will have the shape shown in Fig. 3, providing an intermediate base portion and two side wings flexibly connected thereto and provided with curved outer edges or margins. Such strips, in addition to being very rapidly and economically manufactured, may be shipped to the trade without loss of space as they may be piled one upon the other.

When the article is to be applied to the window the marginal portions are folded up perpendicular to the base as shown in Fig. 4, for placing in the door frame of the car or other window frame space. The side wings being held in the position shown in Fig. 4 by the door frame, their inwardly deflected edges yieldingly grip the edges of the glass in a manner that will be readily apparent.

If desired a thin flexible metal reinforcing sheet may be embodied in the rubber strip as indicated at 9 in Fig. 5. Such metal strips may be readily incorporated in the rubber by providing an extruding machine having a die head which enables the metal strip to be passed through the die opening and the rubber to be extruded around it, such machines being well known to those skilled in the art and needing no further description herein. Such strip if desired may be of reticulated metal.

This application is a division of co-pending application Serial No. 124,263, filed July 28, 1926.

I claim:

1. A flexible window guide comprising a substantially flat strip of rubber enveloped in fabric and having one face plane and the opposite face provided with a pair of parallel channels equidistant from the margins, the fabric extending down into said channels into engagement with the fabric on the opposite face to provide flexible fabric hinges, the strip being adapted to be readily folded into channel form about the flexible fabric hinges without stress on the rubber or unfolded and laid flat without stress on the rubber as desired.

2. A window channel strip comprising an intermediate flat strip of rubber, a substantially flat strip of rubber on each side thereof in the plane of said intermediate strip, a fabric covering completely enveloping and united to said strips of rubber, the upper and lower layers of said fabric covering meeting between the strips to form flexible fabric hinges.

In testimony whereof, I affix my signature.

RICHARD T. GRIFFITHS.